(12) United States Patent
Weidinger et al.

(10) Patent No.: US 8,481,604 B2
(45) Date of Patent: Jul. 9, 2013

(54) EXPANDABLE POLYSILOXANES

(75) Inventors: Jürgen Weidinger, Münster (DE);
Mark E. Harakal, Münster (DE);
Joseph Naseri, Münster (DE)

(73) Assignee: Armacell Enterprise GmbH (DE)

( * ) Notice: Subject to any disclaimer, the term of this patent is extended or adjusted under 35 U.S.C. 154(b) by 219 days.

(21) Appl. No.: 13/018,494

(22) Filed: Feb. 1, 2011

(65) Prior Publication Data
US 2011/0186770 A1 Aug. 4, 2011

(51) Int. Cl.
*C08J 9/35* (2006.01)
*C08L 43/04* (2006.01)

(52) U.S. Cl.
USPC ............ 521/89; 521/150; 521/154; 524/506; 524/588; 525/100; 525/104; 525/105; 525/106

(58) Field of Classification Search
USPC ..... 521/89, 150, 154; 524/506, 588; 525/100, 525/104, 105, 106
See application file for complete search history.

(56) References Cited

U.S. PATENT DOCUMENTS

| | | | |
|---|---|---|---|
| 2,877,211 A | 3/1959 | Nitzsche et al. | |
| 4,066,603 A | 1/1978 | Homan et al. | |
| 4,151,156 A | 4/1979 | Itoh et al. | |
| 4,617,347 A | 10/1986 | D'Sidocky | |
| 4,657,965 A | 4/1987 | Watanabe et al. | |
| 2010/0311855 A1* | 12/2010 | Quante et al. | 521/150 |

FOREIGN PATENT DOCUMENTS

| | | |
|---|---|---|
| DE | 27 02 046 A1 | 1/1977 |
| EP | 0 183 382 B1 | 10/1985 |
| GB | 788598 | 7/1955 |
| GB | 847081 | 9/1960 |
| JP | 2-107657 | 4/1990 |
| JP | 11-140316 | 5/1999 |
| JP | 2009074014 | 4/2009 |
| KR | 10-0404076 | 10/2003 |
| KR | 10-0405123 | 10/2003 |

OTHER PUBLICATIONS

Extended European Search Report issued Feb. 28, 2011, regarding EP application 10152226.6.

* cited by examiner

*Primary Examiner* — Irina S Zemel
(74) *Attorney, Agent, or Firm* — Womble Carlyle Sandridge & Rice LLP; Alireza Behrooz; D. Scott Sudderth

(57) ABSTRACT

The present invention provides a crosslinkable and expandable elastomeric material based on and/or containing siloxane polymer, the process for manufacturing of such material and the use of such material and its blends and composites.

12 Claims, 1 Drawing Sheet

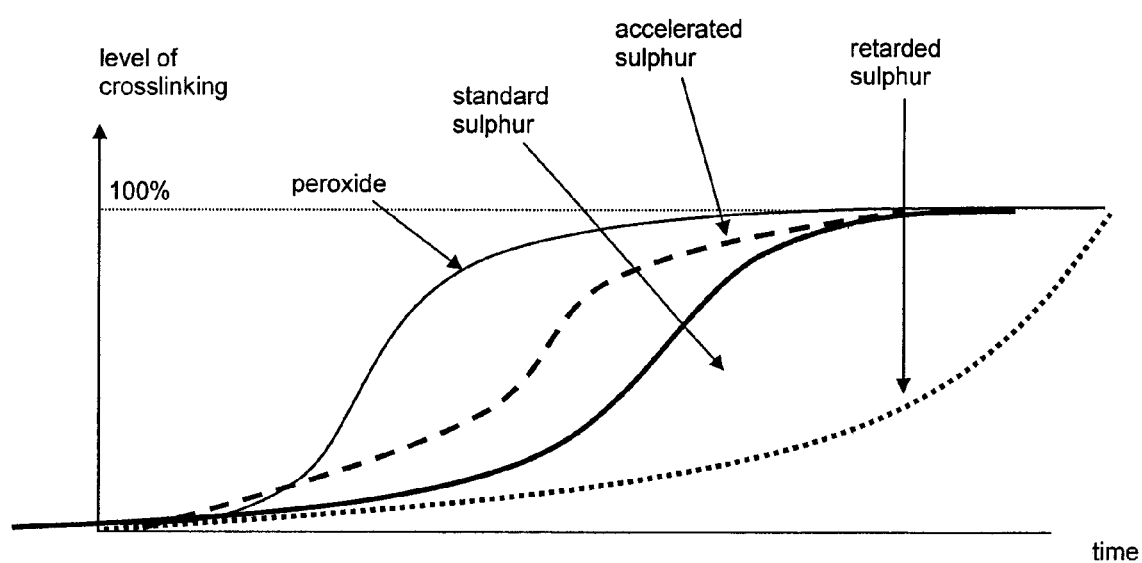

EXPANDABLE POLYSILOXANES

CROSS-REFERENCE TO RELATED APPLICATION

This application claims priority to prior European patent application Ser. No. 10/152,226.6, filed Feb. 1, 2010 and entitled "Expandable Polysiloxanes."

INCORPORATION BY REFERENCE

The entire disclosure of European patent application Ser. No. 10/152,226, filed Feb. 1, 2010, is incorporated herein by reference as if set forth in its entirety.

FIELD OF THE INVENTION

The present invention relates to a crosslinkable and expandable elastomeric material based on and/or containing siloxane polymer, a process for manufacturing of such material, and the use of such material and its blends and composites.

BACKGROUND OF THE INVENTION

Polysiloxane based elastomer compounds (silicones) are known for their interesting properties that can not be provided by any other polymer to that extent, such as very good hot air resistance and low temperature flexibility, "inorganic" backbone, chemical inertness etc. However, as the synthesis of polysiloxanes requires some significant efforts, silicones are relatively expensive. Crosslinking of polysiloxanes to elastomers is done at room temperature by support of metal, e.g., tin compound catalysts; at higher temperatures peroxides or noble metal compound catalysts are preferred, all these methods again contributing to the final compound or part price. Therefore some attempts have been taken to crosslink polysiloxanes by sulphur compounds, as it has been common in the organic rubber industry.

JP 11140316 mentions the possibility of crosslinking silicone by sulphur chloride, a very reactive agent that will cause side reactions and by-products which is not favoured in the industry. U.S. Pat. No. 4,657,965/EP 0183382 describes the use of significantly modified organic side groups of the polysiloxane to render them more accessible to sulphur radical attack and crosslinking, U.S. Pat. No. 4,617,347 claims a blend of silicone and organic rubbers which is said not to be directly curable by sulphur. The solution is said to be a modification of terminal vinyl groups of the silicone by again rather unfavoured chemistry (chlorothio-sulfonamides) to render them sulphur-compatible. These methods however, will lead to even more expenses in synthesis of the respective polysiloxanes.

U.S. Pat. No. 4,066,603/DE 2702046 and U.S. Pat. No. 4,151,156 both disclose the synthesis of mercapto-organo substituted siloxanes that would in principle also be accessible for sulphur, similar for JP 2107657 claiming amino-modification, but it can be expected that such siloxanes are both expensive and will no more preserve the typical silicone property profile. Ind. Eng. Chem. 1957, vol. 49, pp 49-54 mentions the crosslinking of vinyl substituted polysiloxanes by sulphur. However, what could be achieved as final property profile was poor even in comparison to the 1950s' silicones typically bad mechanical levels. Additionally, the vinyl content necessary to obtain reasonable crosslinking is higher by an order of magnitude than usually supplied today. U.S. Pat. No. 2,877,211 describes sulphur containing curing agents for silicone resins, but not elastomers. KR 100405123 mentions the crosslinking of a natural rubber/organic rubber/silicone compound (containing vinyl groups) with sulphur, but without disclosing a reproducible or feasible method; however, peroxide and irradiation crosslinking are mentioned as other—preferred—methods; KR 100404076 is more precise and clearly mentions the parallel use of sulphur and peroxide to cure an organic rubber/silicone compound where it can be expected that the peroxide is responsible for crosslinking the polysiloxane.

Sulphur and sulphur compounds thus are very rarely used in silicone industry as they will intoxicate silicone crosslinking catalysts and/or negatively influence processing or final properties. As a consequence, the use of sulphur for manufacturing expanded polysiloxanes has only been disclosed when using the sulphur compound as modifier, as for example in U.S. Pat. No. 5,998,548, where a sulphur compound is used as an additive (i.e., inhibitor or retarder) to influence the balance of crosslinking and expansion in metal catalyzed crosslinked foam, and in GB 788598 and GB 847081, where sulphur is present as co-crosslinker in resins.

The use of sulphur compounds as curing agents for the manufacture of expanded silicone elastomer is not believed to have been disclosed yet. However, sulphur compound based crosslinking could be interesting especially for expanded materials as the manufacturer will have much more possibilities to influence the curing of the silicone than with peroxides or e.g., platinum catalysts, leading to improved modification of properties and lower densities, as crosslinking is always working versus the expansion and thus has to be optimally suppressed and controlled. The lowest achieved densities of heat cured expanded silicone elastomers are between 250 and 300 $kg/m^3$ (e.g., see US 20080214688, using one of the chemical blowing agents with the highest theoretical gas potential, azodicarbonamide). For room temperature vulcanizing silicone rubbers the lowest reachable density is said to be between 150 and 200 $kg/m^3$, however, these materials are among the most expensive silicones. Further, the level of expansion is limited by the curing system and its controllability, and both the room temperature curing as well as the high temperature crosslinking systems are too fast in one or the other way to efficiently use the gas formation potential of the used expansion agents.

SUMMARY OF THE INVENTION

A major object of the present invention thus is to provide an expandable silicone elastomer and expandable silicone containing elastomer blends not showing the deficiencies mentioned above but maintaining the properties well appreciated for silicones.

Surprisingly, it is found that such polysiloxane based expandable elastomeric material can be achieved by sulphur based crosslinking, if properly applied on properly prepared base mixtures.

Various other objects, features and advantages of the present invention will become apparent to those skilled in the art upon a review of the following Detailed Description of the Invention.

BRIEF DESCRIPTION OF THE FIGURE

FIG. 1 illustrates a comparison of vulcanization curves showing the variability of peroxides and sulfur compounds for crosslinking.

DETAILED DESCRIPTION

The elastomeric material formed according to the principles of the present invention contains a first polysiloxane compound (A), which is a polysiloxane polymer (MVQ) or a mixture of such polymers, and which can be present in the formulation to a level of 50 to 100 weight percent, based on the total polymer content.

The polysiloxanes (A) can be chosen from the polymers of the general formula (a) as set forth below:

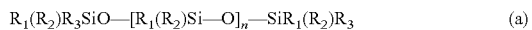

$$R_1(R_2)R_3SiO-[R_1(R_2)Si-O]_n-SiR_1(R_2)R_3 \quad (a)$$

where $R_1$, $R_2$, $R_3$ independently can represent of a polymer —H, —OH, vinyl, phenyl, trifluoropropyl, alkyl, alkenyl, alkinyl, aryl and/or hetero substituted alkyl, alkenyl, alkinyl or aryl groups, given the fact that at least one of the substituents $R_1$, $R_2$, $R_3$ essentially needs to contain an unsaturated bond acting as an active crosslinking site for vulcanisation. Preferably, this unsaturated bond is represented by a vinyl group, and with this group preferably being at terminal position in regard to the polymer chain, as polysiloxanes bearing the like structures are commonly available. The chain length n of formula (a) may vary in a wide range from 10 to 1,000,000 Si—O units depending on the targeted compound properties. A preferred chain length/molecular weight distribution range would be within 10,000 and 250,000 Si—O units, the vinyl content preferably is at least 0.5%, as increased vinyl content will facilitate sulphur based crosslinking.

The claimed material furthermore may contain a second compound (B) which is a polysiloxane of the formula (a) where $R_1$, $R_2$, $R_3$ independently can represent of the substituents mentioned for compound (A), however, preferably at least 80% of these substituents are alkyl groups, preferably methyl groups, given the fact that compound (B) generally should be of significantly lower viscosity than compound (A) to act as a processing aid for ensuring a good dispersion of solids in the matrix of (A) when the mixture is prepared. $R_1$, $R_2$, $R_3$ do not essentially need to contain an unsaturated bond acting as an active crosslinking site for vulcanisation, however, this can be helpful if it is intended to bond the compound (B) to (A) and/or a filler (C) or other ingredients of the mixture. The chain length n for compound (B) of formula (a) may vary in a wide range from 5 to 20,000 Si—O units depending on the intended final mixture and dispersion. A preferred chain length/molecular weight distribution range is within 500 to 10,000 Si—O units. The compound (B) may be present in the formulation from about 0 to about 10% by weight % of the composite elastomeric material.

The claimed material includes one or more fillers (C), which may be chosen from the classes of both active and inactive fillers, such as metal and non metal oxides, carbon black, metal hydroxides, silica, silicates, carbonates, and so on, and mixtures thereof. Especially preferred are fillers of the classes of aluminium trihydrates, silicon oxides/silicon hydrates, such as pyrogenic silica, precipitated silica, silicates, quartz etc. The filler(s) (C) may be contained to an extent of 5-600 weight %, preferably 10-300 weight %, especially preferred 30-100 weight %, calculated based on 100 weight % of the total polymer content.

The claimed material contains a suitable crosslinking system (D), such as sulphur based crosslinking systems containing sulphur and all kind of organic accelerators used in organic rubber industry. Preferred are sulphur, thiurames, polysulfides, thiocarbamates, thioureas, thiazyls, sulphur-Si—O compounds, chlorothio-compounds and mixtures thereof, especially preferred are sulphur, pipentamethylenethiuram tetrasulfide, zinc-N-dibenzyl-dithiocarbamate, N,N'-diphenyl thiourea, ethylene thiourea and dibenzothiazyl disulfide, sulphur silanes, sulphur siloxanes, chlorothio sulfonamides and mixtures thereof.

The claimed material contains a suitable expansion system (E) leading to expansion by either internal pressure, such as, but not exclusively, by gas loading with gases like $CO_2$, $N_2$ or by evaporating liquids, such as, but not exclusively, alkanes, cyclic alkanes etc., or mixtures thereof; or by chemical expansion, such as by compounds forming gas and/or liquid at elevated temperatures; or by a mixture of both methods. Preferred are chemical expansion agents releasing $CO_2$ (e.g. carbonates, carbamates, carbonamides etc.), water or water releasing compounds (including crystal and interchalate water), nitrogen releasing chemicals (e.g. azo compounds, azides, hydrazides), expanding microspheres and hollow spheres in general, containing expandable gases or liquids, expanding clays and graphites and similar particles, and so on, and any mixtures thereof.

The claimed material furthermore may contain additional crosslinkers or co-agents (F) being known to have positive influence on the final vulcanisate's properties, such as silanes, especially organosubstituted silanes, hydrosilanes, hydroxysilanes and heterosubstituted silanes. Especially preferred is the material class of sulphur silanes.

The claimed material may also contain co-agents (G) that are known to provide supplementary effects to crosslinking systems (D) and/or crossbinders or co-agents (F), such as unsaturated polymers which we found during our work may act as a co-agent facilitating and accelerating crosslinking. Preferred are unsaturated polymers having similar polarity and/or morphology like the polysiloxanes, especially preferred are alkylene-diene copolymers. The polymeric co-agents may be present in the claimed material from 0.5 to 50 weight-% calculated on the total polymer content.

The claimed material may also contain co-crosslinkers (H) that are known to have supplementary effects to crosslinking systems (D) or crossbinders or co-agents (F) or co-agents (G), such as peroxides.

The claimed material furthermore may contain flame retardant agents (I) and mixtures thereof, as used in the rubber and plastics industry, such as halogen compounds, metal oxides and hydroxides, metal sulphides, phosphor and phosphorus compounds, melamine based compounds and mixtures thereof. A preferred class of flame retardant agents would be brominated organics which can be combined with synergists like antimony trioxide.

The claimed material may contain plasticizers and/or dispersion aids and/or emulsifiers (J) apart from compound (B) to improve its compounding and manufacturing properties as well as its final properties, such as hardness, in a range of 0-200 weight %, calculated based on 100 weight % of the total polymer content. Preferred are substances that facilitate mixing of ingredients like polysiloxane compound (A) and compound (B) together with ingredients of differing morphology, polarity, etc., as e.g., (L), such as paraffin, mineral oil based plasticizers etc. Especially preferred are waxes and oils bearing surface active properties comparable to tensides, or long chain tensides themselves. Plasticizers, dispersion aids and/or emulsifiers (J) help ensure a homogeneous and stable blend of the polysiloxane with other polymers may also be therefore be salts of long-chain fatty acids, pH buffering systems, hydrous and anhydrous alkali silicate, clays, terpolymers, heteropolymers, and mixtures thereof.

The elastomeric compositions useful in the present invention may be prepared by any conventional procedure such as for example, by mixing the ingredients in an internal mixer or on a mill, and can be prepared in a one-step-mixing process and a one-step-shaping process.

The claimed material furthermore may contain any additive (K) for improving its manufacturing, application, aspect and performance properties, such as inhibitors, retarders, accelerators, stabilizers (e.g., against heat, UV, depolymerisation/reversion), colours etc. Additives (J) can also be chosen of the class of char-forming and/or intumescent additives, such as expanding graphite, vermiculite, perlite etc., to render the material self-intumescent in case of fire to close and protect e.g. wall and bulkhead penetrations. Additives (K) can also consist of substances that will lead to a self-ceramifying effect to protect cables, pipes, wall penetrations etc. in case of fire, such as boron compounds, silicon containing compounds etc. Additives (J) can also consist of internal adhesion promoters to ensure self-adhesive properties in co-extrusion and co-lamination applications, such as silicate esters, functional silanes, polyols, etc.

The claimed material may contain additional polymers or polymer compounds (L) that can be mixed with the rubber compound to obtain a rubber or rubber/plastics blend, such as organic rubbers, other silicones, thermoplastic elastomers, thermoplasts and thermosets/resins, and mixtures thereof. Especially preferred are organic rubbers and organic rubber polymers, as the crosslinking system of the claimed material is fully compatible to those found in organic rubber compounds and therefore blending and co-vulcanisation are easily feasible.

The claimed material may furthermore contain fibres (M) or chopped fibres or pulp as both filler material and reinforcing agent, such as glass fibres, polyaramide fibres, and polyester fibres and so on, and mixtures thereof.

One major advantage of the claimed material is the fact that it can be crosslinked by widespread, well-examined and economic methods like sulphur curing.

Another resulting major advantage of the claimed material is the fact that the vulcanisation can be influenced as known from organic rubbers by accelerating, retarding etc., which is not feasible, e.g., with peroxide curing (see FIGURE 1).

It is a further resulting advantage of the claimed material that it can be expanded to densities being less than 200 kg/m$^3$, preferably less than 150 kg/m$^3$ and significantly lower than known until now, even down to less than 100 kg/m$^3$, providing new property profiles including excellent insulation performance (See table 2).

A further advantage of the claimed material is its reduced gas permeability, achieved both by the crosslinking system itself as well as by the crosslinking system's positive impact on the highest possible filling rate being generally higher than for known silicones and allowing also to add fillers to a high extent that usually are not compatible with standard silicones and their foams, which is a resulting advantage of the claimed material.

A further advantage of the claimed material is that additives used, known and tested within the organic rubber industry may be used in polysiloxane based materials and do neither disturb the vulcanisation and/or expansion system nor are rendered inefficient by standard silicone compositions themselves which, e.g., will allow the use of standard brominated flame retardants.

A resulting advantage of the claimed material is that in comparison to standard silicones it is fully compatible with organic rubbers, thermoplasts, TPEs and thermosets to a very high extent and that it can easily be co-compounded, co-crosslinked, co-moulded and co-extruded/laminated with such materials.

A further advantage of the claimed material is that phthalates are not needed as plasticizers which are partially under discussion and being partially prohibited already for the same reason. Plasticization in the claimed material is achieved by siloxane based ingredients as well as by mixtures thereof with organic plasticizers.

Another advantage of the claimed material is the fact that in its basic configuration it is free of halogen, PVC, fibres etc., all of them being under discussion for health and environmental issues.

It is a further advantage of the claimed material that it can be produced and processed in an economic way on equipment as commonly used in the rubber industry, such as for mixing and shaping processes, e.g., by moulding, extrusion and other shaping methods. It shows versatility in possibilities of manufacturing and application. It can be extruded, co-extruded, laminated, moulded, co-moulded etc., as single item or multilayer and thus it can be applied in unrestricted shaping onto various surfaces for use in thermal or acoustic insulation applications and/or for acoustic or vibration damping applications such as for inside and outside of structures, vessels, containers, pipes, walls, tanks, tubes and ducts and/or in automotive, transport, aeronautics, building and construction, furniture, machinery engineering and many other industries.

It is a resulting advantage of the claimed material that it can be transformed and given shape by standard methods being widespread in the industry and that it does not require specialized equipment.

A further advantage of the claimed material is the fact that it is easily colourable.

It is another advantage of the claimed material that the desired improvements to the expandable elastomeric material are achieved without significantly affecting those properties of polysiloxane based elastomers that are considered as good or even essential, such as heat resistance, cold flexibility, etc., means, the basic typical and positive silicone properties are maintained.

It is a further advantage of the claimed material that it is of low or no toxicity, also concerning smoke creation in case of fire, as there is low smoke creation with low smoke density and low toxicity. Additionally, especially with diene terpolymers being present in the formulation, the limiting oxygen index (LOI) is remarkably high, leading to low flammability in total (see tables 1 and 2).

EXAMPLES

In the following examples and comparative examples, elastomer processing was carried out in the following manner: processing was done in an internal mixer having an inner volume of 0.5 litres; kneading was carried out at between approximately 30 and 60 rpm. The batches were processed as two pass mixes. In the first pass, all ingredients except the sulphur containing agents were added to the internal mixer—polymers first, followed by emulsifiers, then fillers etc.,—and were mixed to a temperature of starting from about 100° C. rising up within 30 min to about 160° C. The mixes were then allowed to cool down and dumped. In the second pass, the base compound was mixed together with the sulphur containing agents to 105° C., dumped and homogenized on a roller mill, and then cooled down on the mill to ambient temperature. In case of peroxides used in the compound, the base was mixed with 2,4-dichlorobenzoyl peroxide on a roller mill at 60° C. and cooled down on the mill. Sample plates of 20×20 cm size and 2 mm or 6 mm thickness, respectively, were prepared in lab press equipment at about 160° C. for 15 minutes.

Table 1 illustrates the elastomeric composition formulations for test samples for Examples 3 and 4 of the present invention, and for Comparative Examples 1 and 2.

TABLE 1

Chemical composition and properties:
The declarations of ingredients and properties recited in table 1 below for the recited comparative examples 1 and 2 and examples 3 and 4 of the present invention are calculated based on 100 weight % of total polymer content. Physical tests were conducted for all example and comparative example compounds after mixing and vulcanization.

|  | Comparative Example 1 | Comparative Example 2 | Example 3 | Example 4 |
|---|---|---|---|---|
| Polysiloxane | 90 | 70 | 90 | 75 |
| EPDM | — | 10 | — | 10 |
| Silicone resin | 4 | 9 | 6 | 6 |
| Silicone oil | 6 | 5 | 4 | 3 |
| Ethylene-vinylacetate | — | 6 | — | 6 |
| Aluminium trihydrate | 130 | 115 | 130 | 100 |
| Silica | 30 | 10 | 30 | 10 |
| Copolyester | 5 | 5 | 5 | 5 |
| Carbon black | 12 | 12 | 12 | — |
| Di-isononylphthalate | — | 12 | 12 | 5 |
| Sulphur | — | — | 5 | 2 |
| Dipentamethylene thiuramtetrasulphide | — | — | 0.5 | 0.3 |
| Zinc dibutyldithiocarbamate | — | — | 0.1 | 0.05 |
| Ethylene thiourea | — | — | 0.1 | 0.1 |
| Zinc dimethyldithiocarbamate | — | — | 0.5 | 0.3 |
| 2,4-dichlorobenzoyl peroxide | 0.5 | 0.5 | — | — |
| Azodicarbonamide | 23.5 | 21.0 | 24.0 | 25.0 |
| Decomposition temperature (° C.), TGA | 480* | 460 | 480* | 430 |
| Glass transition temperature (° C.), DSC | −83 | −72 | −102* | −88 |
| Fire classification EN 12667/EN 13823 | D S1 d0 | D S2 d0 | D S1 d0 | C S1 d0* |
| Tensile strength (N/mm$^2$), ISO 527 | 6.5 | 5.0 | 5.0 | 7.5* |
| Tear resistance (N/mm), ASTM D624 | 13 | 12 | 18* | 16 |
| Elongation at break (%), ISO 527 | 230 | 260 | 450* | 350 |

*marked are best values of the set.

Extruded plates were made on a laboratory extruder with screw diameter of 37.25 mm and screw length of 25 D. The extruder was equipped with a flat die. The extruded plates were transferred into an oven line. The expansion and vulcanisation of the extruded compound was carried out on a continuous oven line with an applied temperature of 170° C. Physical tests were conducted for all compounds after processing, expansion and vulcanisation. Table 2 illustrates analytical data of the foams of such extruded plates.

TABLE 2

Physical data of expanded polysiloxanes

|  | Comparative Example 1 | Comparative Example 2 | Example 3 | Example 4 |
|---|---|---|---|---|
| Wall thickness (expanded sheet) | 25 mm | 25 mm | 25 mm | 25 mm |
| Density [kg/m$^3$], ISO 845 | 360 | 310 | 105 | 75* |
| LOI [%], ISO 4589 | 34 | 29 | 42 | 45* |
| Thermal conductivity at 0° C. [W/mK], EN 12667 | 0.064 | 0.058 | 0.032* | 0.033 |

*marked are best values of the set.

Table 3 describes raw materials used for the Comparative Examples and Examples of tables 1 and 2 and sources thereof.

TABLE 3

Used chemicals

| Chemical | Trade name | Supplier |
|---|---|---|
| Polysiloxane | Rhodorsil ® 753 | Bluestar Silicones |
| Silicone resin | Resin Modifier 4-7081 | Dow Corning |
| Silicone oil | AK 1000/AK 50000 | Wacker Chemie |
| Fumed silica | Aerosil ® 300 | Evonik Degussa |
| Copolyester | Griltex ® P-1533 EP | EMS-Griltech |
| Ethylene-vinylacetate | Elvax ® 250 | DuPont Elastomers |
| Aluminium trihydrate | Martinal ® 107 LE | Martinswerk GmbH |
| Carbon black | Nhumo N 660 | Nhumo |
| Di-Isononylphthalate | Palatinol ® N | BASF |
| Sulphur | Rubersul ® 700 | Nasika Products S.A. |
| Dipentamethylenethiuram-Tetrasulphide | Nasika DPTT-70 | Nasika Products S.A. |
| Zinc dibutyldithiocarbamate | Nasika ZDBC-75 | Nasika Products S.A. |
| Ethylene thiourea | Nasika ETU-75 | Nasika Products S.A. |
| Zinc diethyldithiocarbamate | Nasika ZDEC-70 | Nasika Products S.A. |
| 2,4-dichlorobenzoyl peroxide | — | Jinan Haohua Industry |
| Azodicarbonamide | Tracel ® K 3/95 | Tramaco |

It will be understood by those skilled in the art that while the above identified invention has been described with reference to preferred embodiments, there are numerous additions, modifications and variations that can be made to the present invention without departing from the spirit and scope of the invention.

We claim:

1. An elastomeric material crosslinkable by sulphur compounds and comprising approximately 50 to 99.5 percent by weight of a polysiloxane based on a total polymer content as a main polymer ingredient, and at least 0.5 percent by weight of an unsaturated polymer, based on the total polymer content, wherein the material is expanded to a final density of less than about 200 kg/m$^3$.

2. The material according to claim 1, wherein the unsaturated polymer comprises an alkylene-diene copolymer.

3. The material according to claim 1, wherein the polysiloxane comprises a vinyl content of at least 0.5 mol percent.

4. The material according to claim 1 and further comprising fillers and additives.

5. The material according to claim 4, wherein the elastomeric material is vulcanized and expanded.

6. The material according to claim 5, wherein the elastomeric material is expanded to a foam with mainly closed cells.

7. A process for manufacturing the material according to claim 1, comprising a one-step mixing process and a one-step shaping process.

8. A method for providing acoustic or thermal protection to a surface, the method comprising a material according to claim 1 to the surface.

9. A. method for providing temperature or noise protection to a surface, comprising applying a material according to claim 1 to the surface.

10. A method for treatment, comprising applying a material according to claim 1 to a structure so as to affect at least one of thermal insulation, acoustic insulation, acoustic damping, or vibration damping, of said structure.

11. A method for thermal shielding, comprising applying a material according to claim 1 to inside and outside of structures, vessels, containers, pipes, walls, tanks, tubes, or ducts.

12. The material according to claim 1, wherein the elastomeric material is expanded to a final density of less than about 150 kg/m$^3$.

* * * * *

UNITED STATES PATENT AND TRADEMARK OFFICE
CERTIFICATE OF CORRECTION

PATENT NO. : 8,481,604 B2  
APPLICATION NO. : 13/018494  
DATED : July 9, 2013  
INVENTOR(S) : Weidinger et al.

Page 1 of 1

It is certified that error appears in the above-identified patent and that said Letters Patent is hereby corrected as shown below:

In the Claims

Column 9, line 2, after "comprising" insert --applying--

Signed and Sealed this
Twenty-fourth Day of September, 2013

Teresa Stanek Rea
*Deputy Director of the United States Patent and Trademark Office*